United States Patent
Lee et al.

(10) Patent No.: US 9,891,745 B2
(45) Date of Patent: Feb. 13, 2018

(54) IN-CELL MUTUAL-CAPACITIVE TOUCH PANEL AND TRACE LAYOUT THEREOF

(71) Applicant: Raydium Semiconductor Corporation, Hsinchu (TW)

(72) Inventors: Kun-Pei Lee, Zhunan Township (TW); Yu-Chin Hsu, Hsinchu (TW); Yi-Ying Lin, Hualien (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 53 days.

(21) Appl. No.: 14/858,457

(22) Filed: Sep. 18, 2015

(65) Prior Publication Data
US 2016/0110008 A1    Apr. 21, 2016

Related U.S. Application Data

(60) Provisional application No. 62/090,829, filed on Dec. 11, 2014, provisional application No. 62/079,978, filed on Nov. 14, 2014, provisional application No. 62/065,278, filed on Oct. 17, 2014.

(51) Int. Cl.
G06F 3/041    (2006.01)
G06F 3/044    (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/0416; G06F 3/044
See application file for complete search history.

(56) References Cited

U.S. PATENT DOCUMENTS

| | | | | |
|---|---|---|---|---|
| 2010/0194696 A1* | 8/2010 | Chang | ................... | G06F 3/0412 345/173 |
| 2014/0125626 A1* | 5/2014 | Yang | ................. | G02F 1/134336 345/174 |
| 2014/0306916 A1* | 10/2014 | Wang | ..................... | G06F 3/041 345/173 |
| 2015/0268762 A1* | 9/2015 | Wang | .................... | G06F 3/0412 345/174 |
| 2016/0188029 A1* | 6/2016 | Liu | ..................... | G02F 1/13338 345/174 |

* cited by examiner

*Primary Examiner* — Ryan A Lubit

(57) ABSTRACT

An in-cell mutual-capacitive touch panel having low RC loading and its trace layout are disclosed. A first conductive layer and a second conductive layer are used as bridge of TX electrode and MFL electrode above an active area of in-cell mutual-capacitive touch panel. The second conductive layer and a transparent conductive layer are used as bridge of TX electrode and MFL electrode at the lower-side out of the active area. Cooperated with at least one driving IC having more than two sets of TX electrode pins and MFL electrode pins and the number of the at least one driving IC is determined according to the size of the in-cell mutual-capacitive touch panel. At the same time, the second conductive layer has traces in parallel distributed in the same electrode area of the active area. Therefore, the RC loading of the in-cell mutual-capacitive touch panel of the invention can be largely reduced.

19 Claims, 10 Drawing Sheets

1

| 18 |
|----|
| 17 |
| 16 |
| 15 |
| 14 |
| 13 |
| 12 |
| 11 |
| 10 |

| 28 |
|----|
| 27 |
| 26 |
| 25 |
| 24 |
| 23 |
| 22 |
| 21 |
| 20 |

FIG. 2 (PRIOR ART)

IN-CELL MUTUAL-CAPACITIVE TOUCH PANEL AND TRACE LAYOUT THEREOF

BACKGROUND OF THE INVENTION

Field of the Invention

This invention relates to a touch panel, especially to an in-cell mutual-capacitive touch panel having low RC loading and trace layout thereof.

Description of the Related Art

In general, there are several different laminated structures of the capacitive touch panel, for example, an in-cell capacitive touch panel or an on-cell capacitive touch panel.

Please refer to FIG. 1 and FIG. 2. FIG. 1 and FIG. 2 illustrate two different laminated structures of the in-cell capacitive touch panel and the on-cell capacitive touch panel respectively. As shown in FIG. 1, the laminated structure 1 of the on-cell capacitive touch panel includes a substrate 10, a thin-film transistor layer 11, a liquid crystal layer 12, a color filtering layer 13, a glass layer 14, a touch sensing layer 15, a polarizer 16, an adhesive 17, and top lens 18. As shown in FIG. 2, the laminated structure 2 of the in-cell capacitive touch panel includes a substrate 20, a thin-film transistor layer 21, a touch sensing layer 22, a liquid crystal layer 23, a color filtering layer 24, a glass layer 25, a polarizer 26, an adhesive 27, and top lens 28.

After comparing FIG. 1 with FIG. 2, it can be found that the touch sensing layer 22 of the in-cell capacitive touch panel is disposed under the liquid crystal layer 23; that is to say, the touch sensing layer 22 is disposed in the liquid crystal display module of the in-cell capacitive touch panel. On the other hand, the touch sensing layer 15 of the on-cell capacitive touch panel is disposed above the glass layer 14; that is to say, the touch sensing layer 15 is disposed out of the liquid crystal display module of the on-cell capacitive touch panel. Therefore, compared to the conventional one glass solution (OGS) and on-cell capacitive touch panel, the in-cell capacitive touch panel can achieve thinnest touch panel design and widely used in portable electronic products such as mobile phones, tablet PCs, and notebooks.

Therefore, the invention provides an in-cell mutual-capacitive touch panel and trace layout thereof to solve the above-mentioned problems.

SUMMARY OF THE INVENTION

A preferred embodiment of the invention is an in-cell mutual-capacitive touch panel. In this embodiment, the in-cell mutual-capacitive touch panel includes a plurality of pixels. A laminated structure of each pixel includes a substrate, a thin-film transistor layer, a liquid crystal layer, a color filtering layer, and a glass layer. The thin-film transistor layer is disposed above the substrate. A first conductive layer and a second conductive layer are integrated in the thin-film transistor layer. The first conductive layer, a source electrode, and a drain electrode are formed simultaneously, and the second conductive layer is connected with a transparent conductive layer coupled to a common voltage. The liquid crystal layer is disposed above the thin-film transistor layer. The color filtering layer is disposed above the liquid crystal layer. The glass layer is disposed above the color filtering layer. The first conductive layer and the second conductive layer are used as bridges of a transmitter electrode and a multi-function electrode above an active area of the in-cell mutual-capacitive touch panel. The second conductive layer and the transparent conductive layer are used as bridges of the transmitter electrode and the multi-function electrode at the lower-side out of the active area of the in-cell mutual-capacitive touch panel. The in-cell mutual-capacitive touch panel is cooperated with at least one driving IC having more than two sets of transmitter electrode pins and multi-function electrode pins. The number of the at least one driving IC is determined according to a size of the in-cell mutual-capacitive touch panel, and the at least one driving IC is disposed out of the active area of the in-cell mutual-capacitive touch panel.

In an embodiment, at least two traces of the second conductive layer are aligned in parallel within the active area of the in-cell mutual-capacitive touch panel.

In an embodiment, the in-cell mutual-capacitive touch panel is suitable for displays using in-plane switching liquid crystal (IPS) technology, fringe field switching (FFS) technology, or advanced hyper-viewing angle (AHVA) technology.

In an embodiment, the color filtering layer comprises a color filter and a black matrix resist, and the black matrix resist has good light resistance.

In an embodiment, the first conductive layer and the second conductive layer are disposed under the black matrix resist.

In an embodiment, the first conductive layer and the second conductive layer are coupled or not.

In an embodiment, the first conductive layer and the second conductive layer are aligned horizontally, perpendicularly, or in a mesh type.

In an embodiment, the second conductive layer disposed above the transparent conductive layer is connected with the transparent conductive layer through a via.

In an embodiment, the second conductive layer disposed under the transparent conductive layer is connected with the transparent conductive layer through a via.

In an embodiment, the transmitter electrode, the multi-function electrode, and a receiver electrode cover different parts of the plurality of pixels, and the multi-function electrode is disposed between the transmitter electrode and the receiver electrode.

In an embodiment, transparent conductive layers in the pixels covered by the transmitter electrode are connected, transparent conductive layers in the pixels covered by the receiver electrode are connected, and transparent conductive layers in the pixels covered by the multi-function electrode are connected.

In an embodiment, the transparent conductive layer is an indium tin oxide (ITO) layer.

Another preferred embodiment of the invention is also an in-cell mutual-capacitive touch panel. In this embodiment, the in-cell mutual-capacitive touch panel includes a plurality of pixels. A laminated structure of each pixel includes a substrate, a thin-film transistor layer, a liquid crystal layer, a color filtering layer, and a glass layer. The thin-film transistor layer is disposed above the substrate. A first conductive layer and a second conductive layer are integrated in the thin-film transistor layer. The first conductive layer, a source electrode, and a drain electrode are formed simultaneously, and the first conductive layer is connected with a transparent conductive layer coupled to a common voltage, the second conductive layer is disposed above the first conductive layer. The liquid crystal layer is disposed above the thin-film transistor layer. The color filtering layer is disposed above the liquid crystal layer. The glass layer is disposed above the color filtering layer.

Compared to the prior arts, the in-cell mutual-capacitive touch panel of the invention has following advantages:

(1) The simplest laminated structure design of in-cell touch panel can be formed in this invention by the integration of two conductive layers and original display components. The manufacturing will be easy and the cost can be reduced.

(2) The design of the touch electrodes and their traces in the in-cell touch panel of the invention is very simple.

(3) The effects of resistance and parasitic capacitance of in-cell touch components on the electric properties of the in-cell touch panel can be reduced by the novel trace layout method of the invention.

(4) The RC loading of the middle size touch panel or large size touch panel can be largely reduced by the novel electrode trace method of the invention.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 and FIG. 2 illustrate two different laminated structures of the in-cell capacitive touch panel and the on-cell capacitive touch panel respectively.

DETAILED DESCRIPTION OF THE APPENDED DRAWINGS

A preferred embodiment of the invention is an in-cell capacitive touch panel. In practical applications, the in-cell capacitive touch panel can achieve thinnest touch panel design; therefore, it can be widely used in portable electronic products such as mobile phones, tablet PCs, and notebooks.

In this embodiment, the in-cell mutual-capacitive touch panel can be suitable for displays using in-plane switching liquid crystal (IPS) technology, fringe field switching (FFS) technology, or advanced hyper-viewing angle (AHVA) technology, but not limited to these cases.

In general, the most popular capacitive touch sensing technology in nowadays should be the projected capacitive touch sensing technology including a mutual-capacitive type and a self-capacitive type. As to the mutual-capacitive touch sensing technology, when a touch occurs, capacitive coupling will be generated between two electrode layers adjacent to the touch point, and the capacitance change between the two electrode layers will be used to determine the touch point. As to the self-capacitive touch sensing technology, when a touch occurs, capacitive coupling will be generated between the touch item and the electrode, and the capacitance change of the electrode will be used to determine the touch point.

It should be noticed that the in-cell touch panel of this embodiment can use the mutual-capacitive touch sensing technology. The in-cell mutual-capacitive touch panel of this embodiment can be formed by the integration of two conductive layers and the display components and the effects of the in-cell touch components on the electrical and optical characteristics of the in-cell touch panel of this embodiment can be reduced through novel trace and layout method.

Then, the integration of the two conductive layers and the display components in the laminated structure of the in-cell capacitive touch panel of this embodiment will be introduced in detail as follows.

Figure 3:
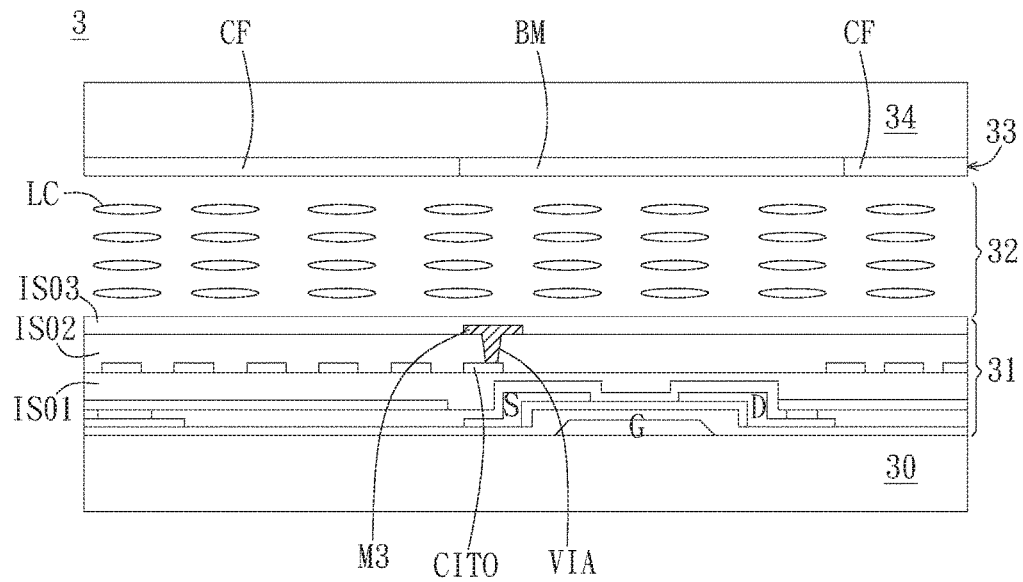
FIG. 3 illustrates a schematic diagram of the laminated structure of the in-cell capacitive touch panel in a preferred embodiment of the invention.

As shown in FIG. 3, in an embodiment, the laminated structure 3 of the in-cell capacitive touch panel includes a substrate 30, a thin-film transistor layer 31, a liquid crystal layer 32, a color filtering layer 33, and a glass layer 34. The color filtering layer 33 includes a color filter CF and a black matrix resist BM. The black matrix resist BM has good light resistance and it can be used to separate three different color filters including a red (R) color filter, a green (G) color filter, and a blue (b) color filter. The liquid crystal layer 32 includes a plurality of liquid crystals LC.

In this embodiment, the conductive layer M2 and the source electrode S and the drain electrode D of the thin-film transistor layer 31 are formed in the same material and the same manufacturing process; therefore, there will be no extra complexity of the manufacturing process. In fact, the conductive layer M2 can be formed by any conductive materials and it can be aligned horizontally, perpendicularly, or in a mesh type. The thin-film transistor layer 31 also includes a gate electrode G.

The conductive layer M3 is disposed under the black matrix resist BM of the color filtering layer 33; therefore, the conductive layer M3 can be shielded by the black matrix resist BM having good light resistance, but not limited to this case.

It should be noticed that since the conductive layer M2 is mainly used as traces or bridges, the conductive layer M2 will be disposed out of the active area of the in-cell capacitive touch panel instead of being disposed within the active area of the in-cell capacitive touch panel.

As to the conductive layer M3, the conductive layer M3 can be also formed by any conductive materials and it can be also aligned horizontally, perpendicularly, or in a mesh type. Similarly, the conductive layer M3 can be also disposed under the black matrix resist BM of the color filtering layer 33 to be shielded by the black matrix resist BM having good light resistance, but not limited to these cases.

It should be noticed that since the conductive layer M3 is used as a touch electrode, the conductive layer M3 should be coupled to a transparent conductive layer CITO (e.g., indium tin oxide, ITO) which is coupled to a common voltage (VCOM). In fact, this transparent conductive layer can be formed by any other transparent conductive materials without any limitations. In this embodiment, as shown in FIG. 3, the transparent conductive layer CITO is formed above an insulating layer ISO1 and then covered by another insulating layer ISO2. Then, a via VIA is formed on the insulating layer ISO2, so that the conductive layer M3 formed above the insulating layer ISO2 can be coupled to the transparent conductive layer CITO through the via VIA. Afterwards, the conductive layer M3 will be covered by another insulating layer ISO3 to separate the conductive layer M3 and the liquid crystal layer 32.

Figure 4:
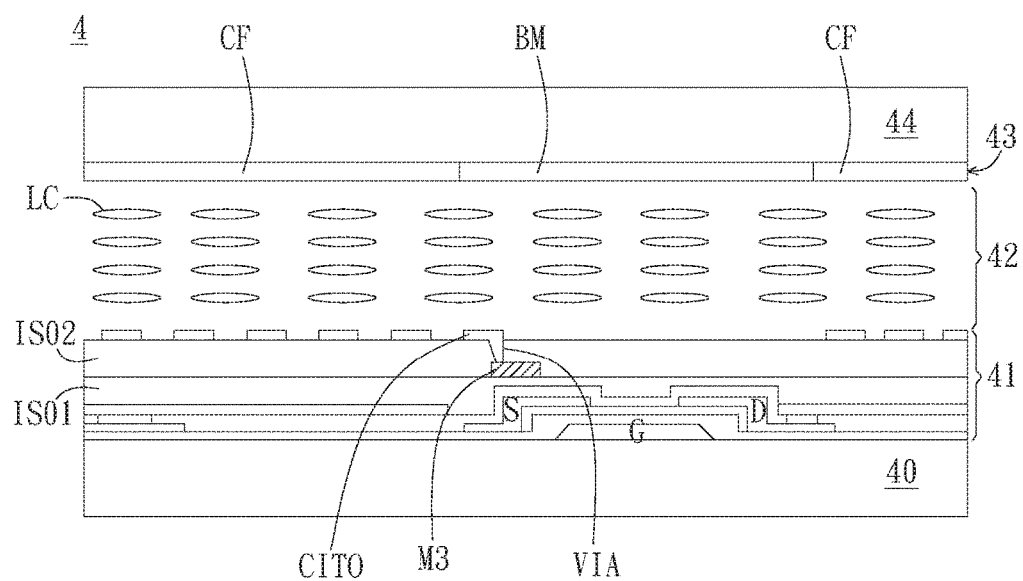
FIG. 4 illustrates a schematic diagram of the laminated structure of the in-cell capacitive touch panel in another preferred embodiment of the invention.

In another embodiment, as shown in FIG. 4, the laminated structure 4 of the in-cell capacitive touch panel includes a substrate 40, a thin-film transistor layer 41, a liquid crystal layer 42, a color filtering layer 43, and a glass layer 44; in the laminated structure 4 of the in-cell capacitive touch panel, the conductive layer M3 is formed above the insulating layer ISO1 and then covered by another insulating layer ISO2. Then, a via VIA is formed on the insulating layer ISO2, so that the transparent conductive layer CITO formed above the insulating layer ISO2 can be coupled to the conductive layer M3 through the via VIA.

It should be noticed that although TFT-LCD panels shown in FIG. 3 and FIG. 4 are taken as embodiments of the invention, the invention can be also used in the display panel having color filter on array (COA) structure to further increase the aperture ratio of the display panel.

Next, the electrode traces of the in-cell capacitive touch panel of this embodiment will be introduced as follows.

Figure 5:
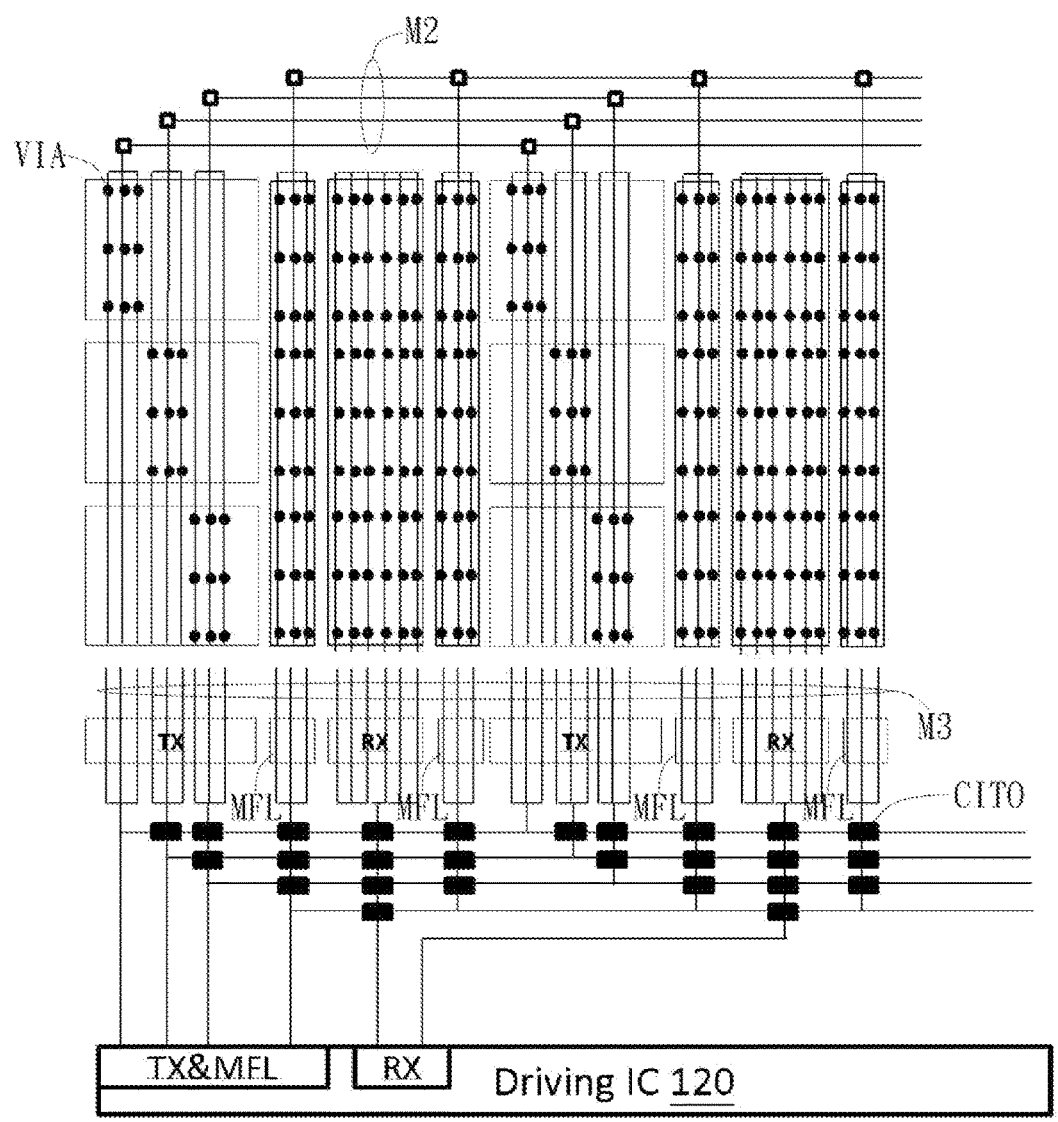
FIG. 5 illustrates a schematic diagram of the electrode traces of the in-cell capacitive touch panel.

As shown in FIG. 5, in the in-cell mutual-capacitive touch panel 5, each block P represents a pixel or a sub-pixel, and different block ranges covering blocks P can be set based on practical needs to represent different touch electrodes capable of performing different functions. For example, the different touch electrodes can include transmitter electrodes TX used to input touch driving signals, receiver electrodes RX used to receive touch sensing signals, and multi-function electrodes MFL.

Each circle dot VIA in the active area of the in-cell mutual-capacitive touch panel 5 represents a via as shown in FIG. 3 and it is used for the conductive layer M3 to connect with the transparent conductive layer CITO to complete the connection between the touch electrode and its traces. Each square dot VIA at the upper-side out of the active area of the in-cell mutual-capacitive touch panel 5 is used as a bridge of the transmitter electrode TX and multi-function electrode MFL to connect the conductive layer M3 with the conductive layer M2. The number and positions of the square dots VIA can be determined based on different circuit designs. The traces at the lower-side out of the active area of the in-cell mutual-capacitive touch panel 5 are all the conductive layer M3, and the transparent conductive layer CITO is used as a bridge of the transmitter electrode TX and multi-function electrode MFL.

It should be noticed that the transparent conductive layers CITO in the pixels covered by the transmitter electrodes TX will be connected to each other; the transparent conductive layers CITO in the pixels covered by the receiver electrodes RX will be also connected to each other; the transparent conductive layers CITO in the pixels covered by the multi-function electrodes MFL will be connected to each other. The multi-function electrode MFL is disposed between the transmitter electrode TX and the receiver electrode RX. The multi-function electrode MFL can be set to perform different functions, such as coupled to the ground terminal (GND), the common voltage (VCOM), or any other voltage levels. The multi-function electrode MFL can increase the flexibility of using electrodes, but it can be also omitted.

The conductive layer M3 traces of the transmitter electrodes TX can form pins out of the active area of the in-cell mutual-capacitive touch panel 5 respectively. The lateral connections of the different conductive layer M3 traces belonged to different dotted line areas of transmitter electrode TX are done by another conductive layer M2 at the upper-side out of the active area of the in-cell mutual-capacitive touch panel 5 and by the connection between the conductive layer M3 and the transparent conductive layer CITO at the lower-side out of the active area of the in-cell mutual-capacitive touch panel 5. Therefore, the aperture ratio of the in-cell mutual-capacitive touch panel 5 will not be affected.

As shown in FIG. 5, in the in-cell mutual-capacitive touch panel 5, at least two traces of the conductive layer M3 are aligned in parallel within the active area of the in-cell mutual-capacitive touch panel 5. For example, at least two conductive layer M3 traces of the transmitter electrodes TX are aligned in parallel within the range of the transmitter electrodes TX in the in-cell mutual-capacitive touch panel 5, so that the resistance can be reduced due to the parallel alignment of the conductive layer M3 traces.

It should be noticed that no matter in the range of the transmitter electrode TX or the range of the receiver electrode RX, the conductive layer M3 traces can be aligned in parallel to reduce resistance.

In addition, for the conventional middle size touch panel or large size touch panel, the way that the electrode traces connect to the driving IC will also affect the entire RC loading of the touch panel. Therefore, the mutual-capacitive traces out of the active area of the large size in-cell mutual-capacitive touch panel will be introduced as follows.

Figure 6:
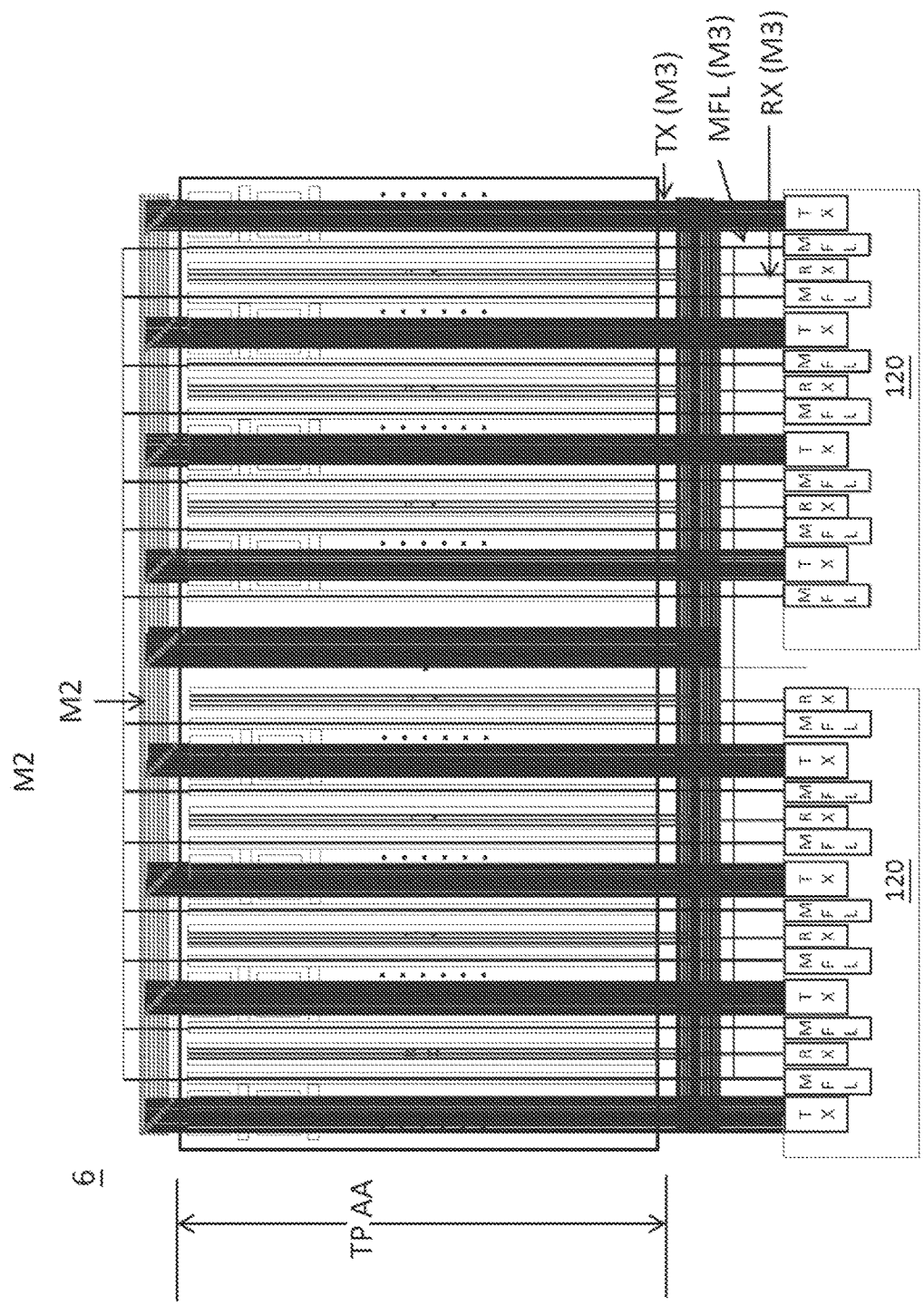
FIG. 6 illustrates a schematic diagram of the traces of the in-cell capacitive touch panel.
Figures 7A, 7B:
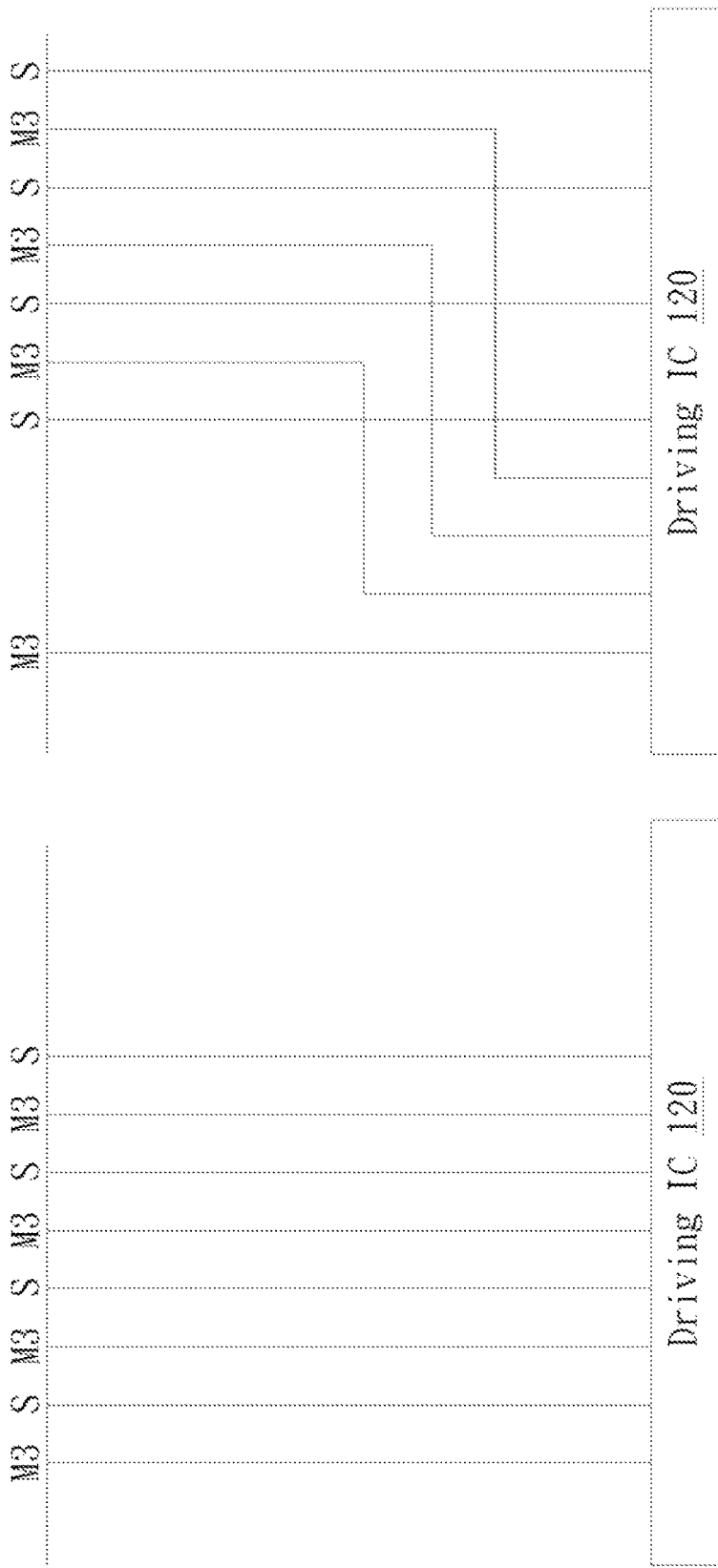
FIG. 7A illustrates a schematic diagram of the traces of the receiver electrode and the source lines of the TFT component being interspersed with each other to connect to the driving IC disposed out of the active area of the panel.
FIG. 7B illustrates a schematic diagram of the traces of the receiver electrode across the adjacent source lines first and then the traces of the receiver electrode are together connected to the driving IC disposed out of the active area of the panel.

In an embodiment, as shown in FIG. 6, a group of conductive layer M3 traces belonged to the transmitter electrode TX is together connected to the driving IC 120 disposed out of the active area TPAA of the in-cell mutual-capacitive touch panel 6. The conductive layer M3 traces belonged to the receiver electrode RX and the source lines S of the TFT components can be interspersed with each other to connect to the driving IC 120 disposed out of the active area TPAA of the in-cell mutual-capacitive touch panel 6 as shown in FIG. 7A, or the conductive layer M3 traces belonged to the receiver electrode RX can across the adjacent source lines S first and then the conductive layer M3 traces belonged to the receiver electrode RX are together connected to the driving IC 12 disposed out of the active area TPAA of the in-cell mutual-capacitive touch panel 6 as shown in FIG. 7B.

By doing so, under a condition that the driving IC 120 has enough channels, the above-mentioned alignment of the conductive layer M3 traces can largely reduce the RC loading of the middle size touch panel or large size touch panel.

It should be noticed that FIG. 6 illustrates that a driving IC 120 can be connected with four groups of conductive layer M3 traces belonged to the transmitter electrode TX and the multi-function electrode MFL, but not limited to this case. In fact, each driving IC 120 can be connected with at least two groups of conductive layer M3 traces belonged to the transmitter electrode TX and the multi-function electrode MFL based on different designs. The lateral connections of the different conductive layer M3 traces are done by another conductive layer M2 at the upper-side out of the active area TPAA of the in-cell mutual-capacitive touch panel 6 and the transparent conductive layer CITO is used as bridge of the conductive layer M3 at the lower-side out of the active area TPAA of the in-cell mutual-capacitive touch panel 6.

Figure 8:
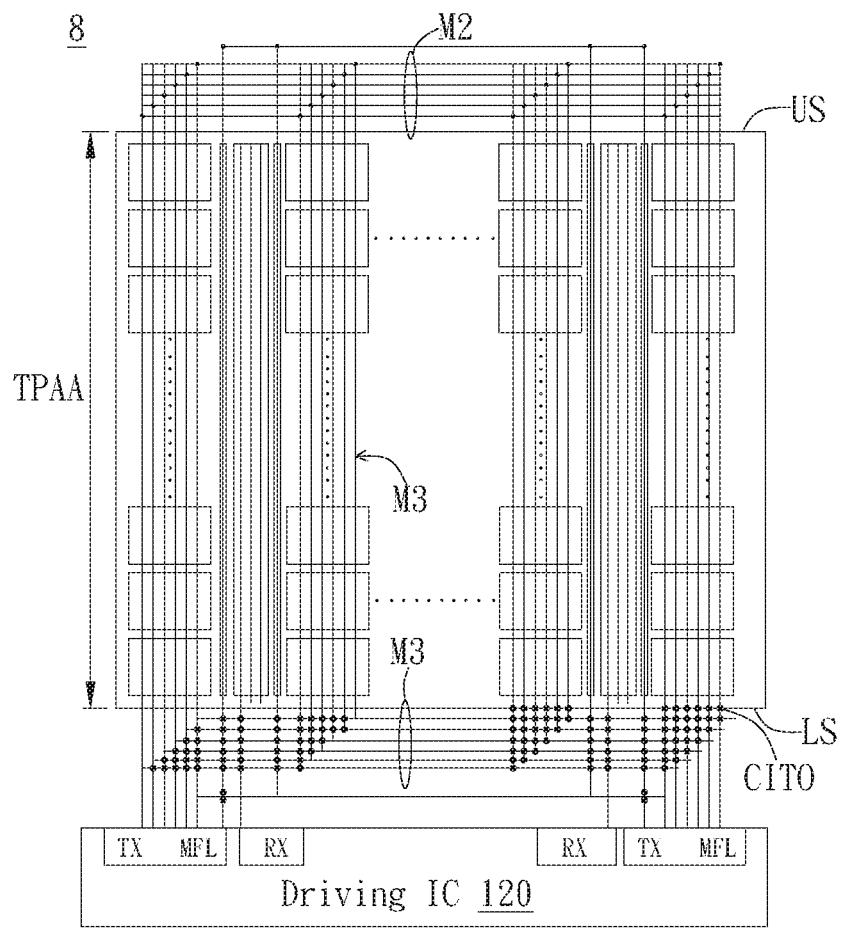
FIG. 8 illustrates a schematic diagram of the electrode traces out of the active area of the in-cell capacitive touch panel.

In another embodiment, as shown in FIG. 8, the lateral connections of the different conductive layer M3 traces are done not only out of the upper-side US of the active area TPAA of the in-cell mutual-capacitive touch panel 8, but also out of the lower-side LS of the active area TPAA of the in-cell mutual-capacitive touch panel 8. The difference between them is that the lateral connections of the different conductive layer M3 traces out of the upper-side US of the active area TPAA of the in-cell mutual-capacitive touch panel 8 are done by another conductive layer M2, while the lateral connections of the different conductive layer M3 traces out of the lower-side LS of the active area TPAA of the in-cell mutual-capacitive touch panel 8 are done by lateral and perpendicular traces of conductive layer M3 and the transparent conductive layer CITO coupled to the common voltage VCOM is used as bridge. By doing so, the entire resistance of this embodiment can be further reduced, so that the RC loading of the in-cell mutual-capacitive touch panel 8 can be further reduced.

Figure 9:
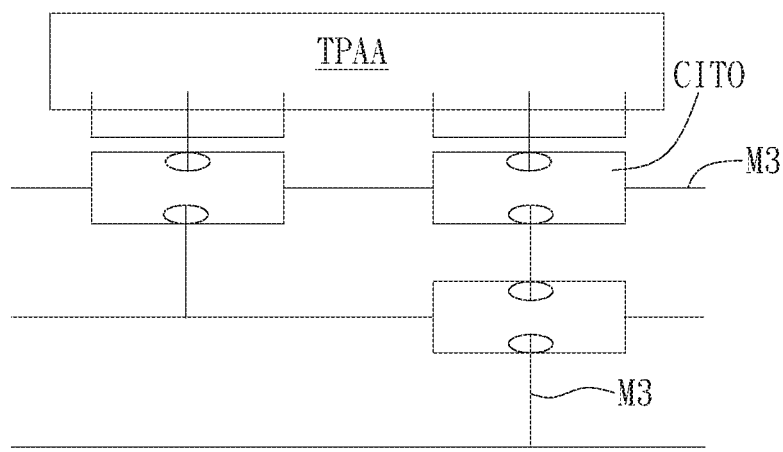
FIG. 9 illustrates a larger schematic diagram of the lateral connection of the traces formed at the lower-side out of the active area of the in-cell capacitive touch panel of FIG. 8.
Figure 10:
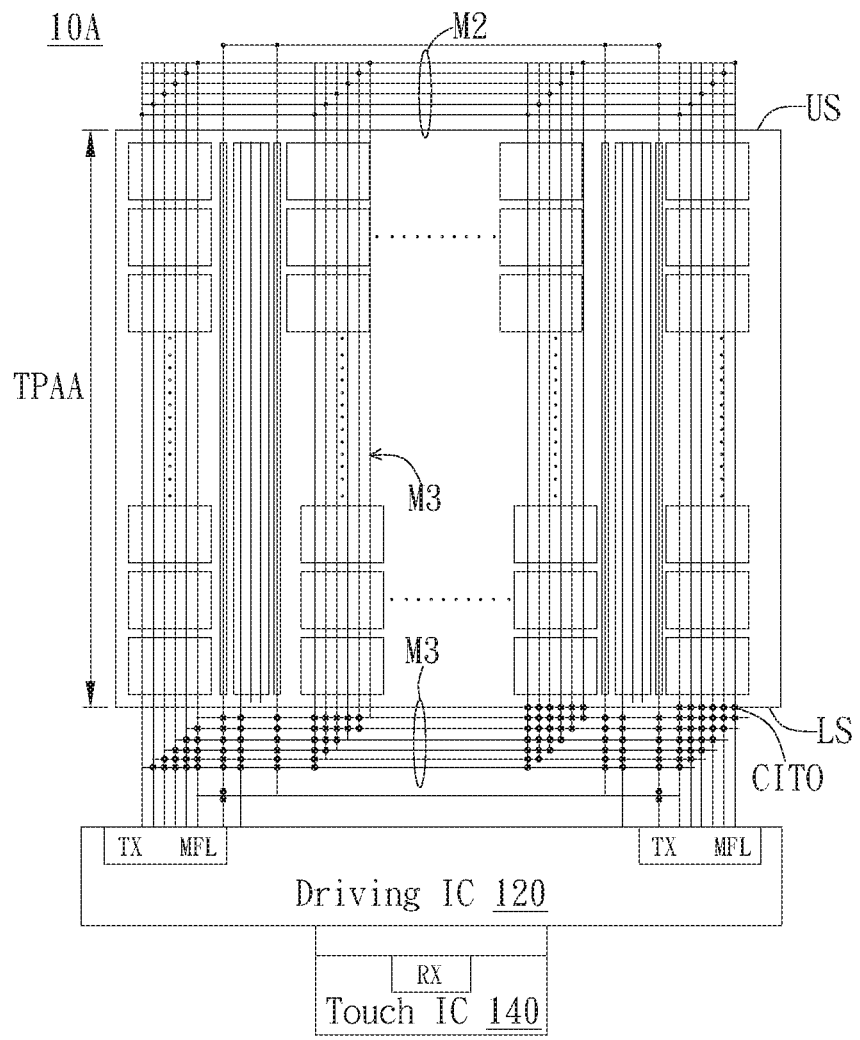
FIG. 10 illustrates a schematic diagram of the receiver electrode RX is controlled by a touch IC if the driving IC is not an integrated IC.

Please refer to FIG. 9. FIG. 9 illustrates a larger schematic diagram of the lateral connection of the traces formed at the lower-side out of the active area TPAA of the in-cell capacitive touch panel 8 of FIG. 8. It can be found that the transparent conductive layer CITO is used as bridge for the lateral traces of conductive layer M3 across the perpendicular traces of conductive layer M3, or for the perpendicular traces of conductive layer M3 across the lateral traces of conductive layer M3. That is to say, the bridge can be disposed along a direction parallel to the source line or perpendicular to the source line without specific limitations. FIG. 9 only shows one design of bridge; the bridges aligned along in the same direction can be integrated into a bridge to reduce resistance, but not limited to this case. As to FIG. 10, FIG. 10 illustrates a schematic diagram of the receiver electrode RX is controlled by a touch IC 140 if the driving IC is not an integrated IC.

Another preferred embodiment of the invention is an in-cell capacitive touch panel. In practical applications, the in-cell capacitive touch panel can achieve thinnest touch panel design; therefore, it can be widely used in portable electronic products such as mobile phones, tablet PCs, and notebooks.

In this embodiment, the in-cell mutual-capacitive touch panel can be suitable for displays using in-plane switching liquid crystal (IPS) technology, fringe field switching (FFS) technology, or advanced hyper-viewing angle (AHVA) technology, but not limited to these cases.

It should be noticed that the in-cell touch panel of this embodiment can use the mutual-capacitive touch sensing technology. The in-cell mutual-capacitive touch panel of this embodiment can be formed by the integration of two conductive layers and the display components and the effects of the in-cell touch components on the electrical and optical characteristics of the in-cell touch panel of this embodiment can be reduced through novel trace and layout method.

Then, the integration of the two conductive layers and the display components in the laminated structure of the in-cell capacitive touch panel of this embodiment will be introduced in detail as follows.

Figure 11:
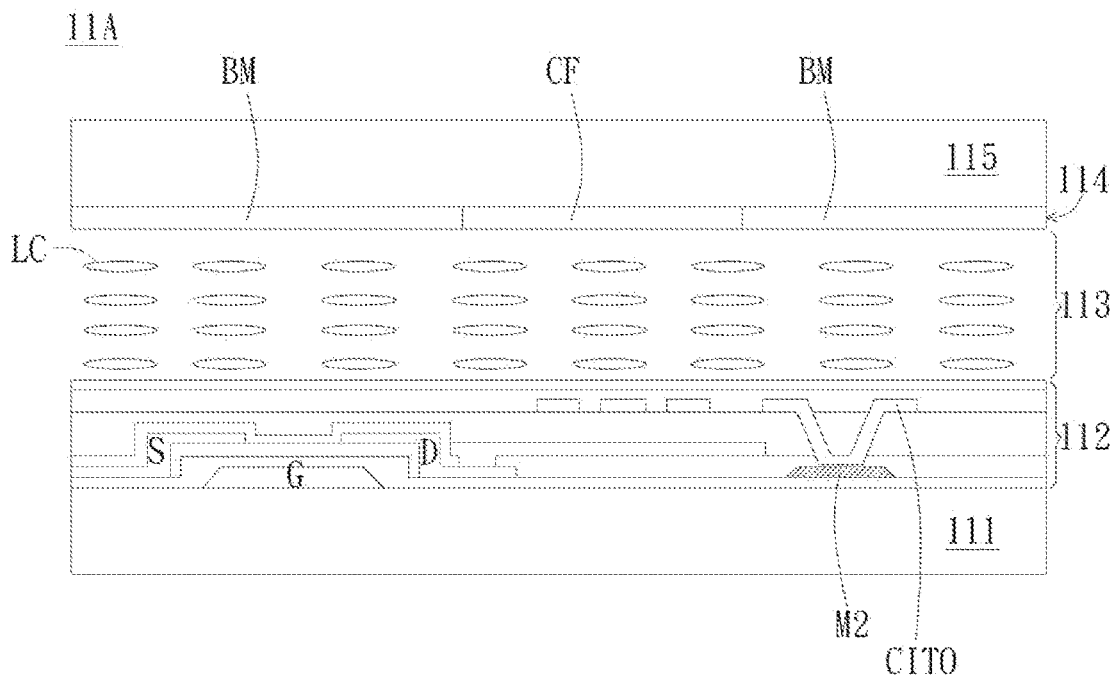
FIG. 11 illustrates a schematic diagram of the laminated structure of the in-cell capacitive touch panel in another preferred embodiment of the invention.

As shown in FIG. 11, in an embodiment, the laminated structure 11A of the in-cell capacitive touch panel includes a substrate 111, a thin-film transistor layer 112, a liquid crystal layer 113, a color filtering layer 114, and a glass layer 115. The color filtering layer 114 includes a color filter CF and a black matrix resist BM. The black matrix resist BM has good light resistance and it can be used to separate three different color filters including a red (R) color filter, a green (G) color filter, and a blue (b) color filter. The conductive layers M2 and M3 are integrated in the thin-film transistor layer 112. The conductive layers M2 and M3 can be coupled to each other or not.

In this embodiment, the conductive layer M2 and the source electrode S and the drain electrode D of the thin-film transistor layer 112 are formed in the same material and the same manufacturing process; therefore, there will be no extra complexity of the manufacturing process. In fact, the conductive layer M2 can be formed by any conductive materials and it can be aligned horizontally or perpendicularly.

The conductive layer M2 is disposed under the black matrix resist BM of the color filtering layer 114; therefore, the conductive layer M2 can be shielded by the black matrix resist BM having good light resistance, but not limited to this case.

It should be noticed that the conductive layer M2 can be coupled to the common voltage (VCOM) or not. As shown in FIG. 11, the conductive layer M2 is used as a touch electrode by being coupled to the transparent conductive layer CITO which is coupled to the common voltage (VCOM). Since different panel designs can be done based on practical panel types and characteristics, it is not limited to this case.

As to the conductive layer M3, in this embodiment, the conductive layer M3 can be formed by any conductive materials and it can be aligned horizontally, perpendicularly, or in a mesh type. Similarly, the conductive layer M3 can be disposed under the black matrix resist BM to be shielded by the black matrix resist BM having good light resistance, but not limited to these cases.

Figure 12:
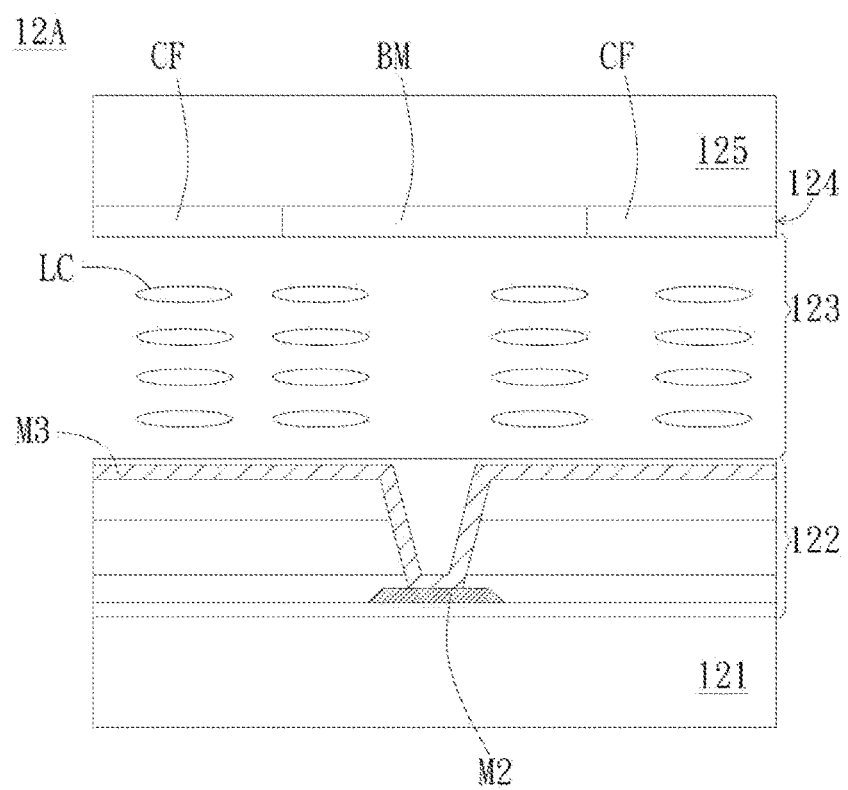
FIG. 12 illustrates a schematic diagram of the laminated structure that the conductive layer M3 is formed above the conductive layer M2 and the conductive layer M3 and the conductive layer M2 are coupled.

It should be noticed that the conductive layer M3 can be coupled to the conductive layer M2 or not without any specific limitations. As shown in FIG. 12, the laminated structure 12A of the in-cell capacitive touch panel includes a substrate 121, a thin-film transistor layer 122, a liquid crystal layer 123, a color filtering layer 124, and a glass layer 125; the conductive layer M3 is formed on the conductive layer M2, so that the conductive layer M3 and the conductive layer M2 are coupled to each other. In fact, there will be different panel design ways according to different types of panels and their different characteristics, so not limited to these cases.

Then, the electrode traces layouts used by the in-cell mutual-capacitive touch panel in this embodiment will be introduced as follows.

Figure 13:
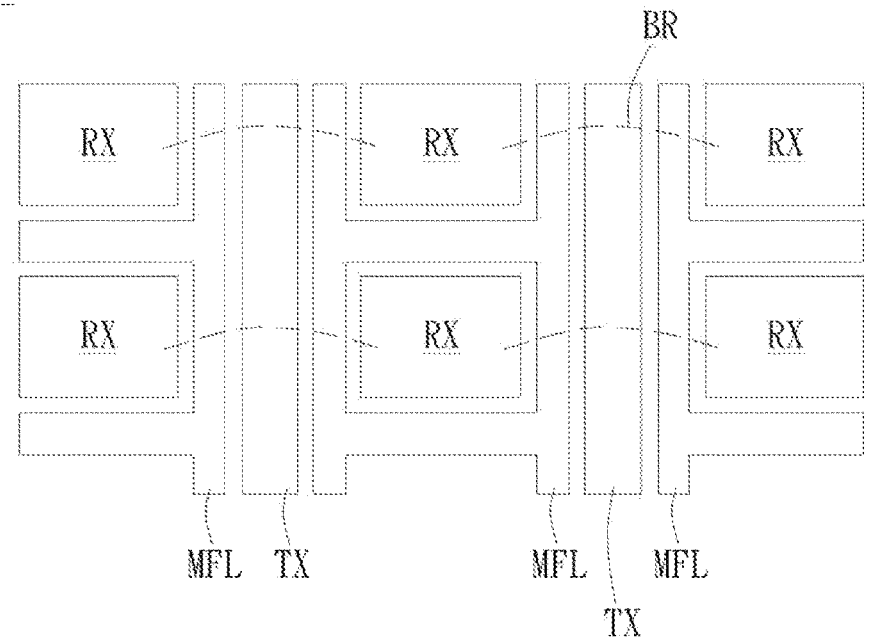
FIG. 13 illustrates a schematic diagram of the electrode traces of the in-cell capacitive touch panel in another preferred embodiment of the invention.

As shown in FIG. 13, the in-cell mutual-capacitive touch panel 13A includes transmitter electrodes TX, receiver electrodes RX, and multi-function electrodes MFL. Wherein, different transmitter electrodes TX are coupled through bridge units BR; different receiver electrodes RX are also coupled through bridge units BR.

The multi-function electrodes MFL is disposed between the transmitter electrodes TX and the receiver electrodes RX. The multi-function electrode MFL can be set to perform different functions, such as coupled to the ground terminal (GND), the common voltage (VCOM), or any other voltage levels. The multi-function electrode MFL can increase the flexibility of using electrodes, but it can be also omitted.

Figure 14:
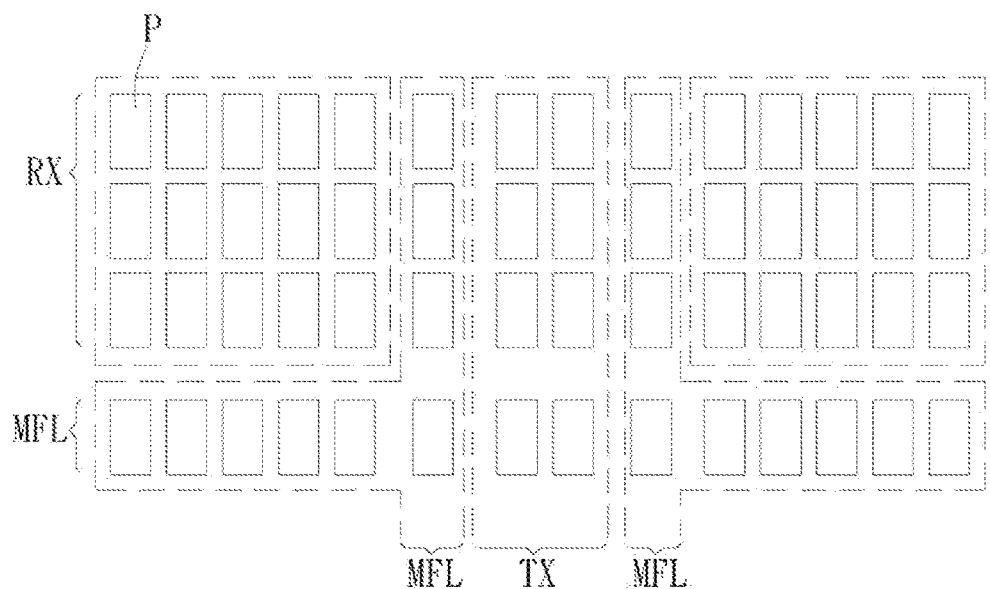
FIG. 14 illustrates a larger schematic diagram of the electrode traces in the upper left corner of FIG. 13.

Then, as shown in FIG. 14, each block P can represent a pixel or a sub-pixel depends on practical situation. Different dotted line ranges represent transmitter electrodes TX, receiver electrodes RX, and multi-function electrodes MFL. Each pixel can be formed by display components such as gate electrodes, source electrodes, drain electrodes, and common voltage, but not limited to this case.

Figure 15:
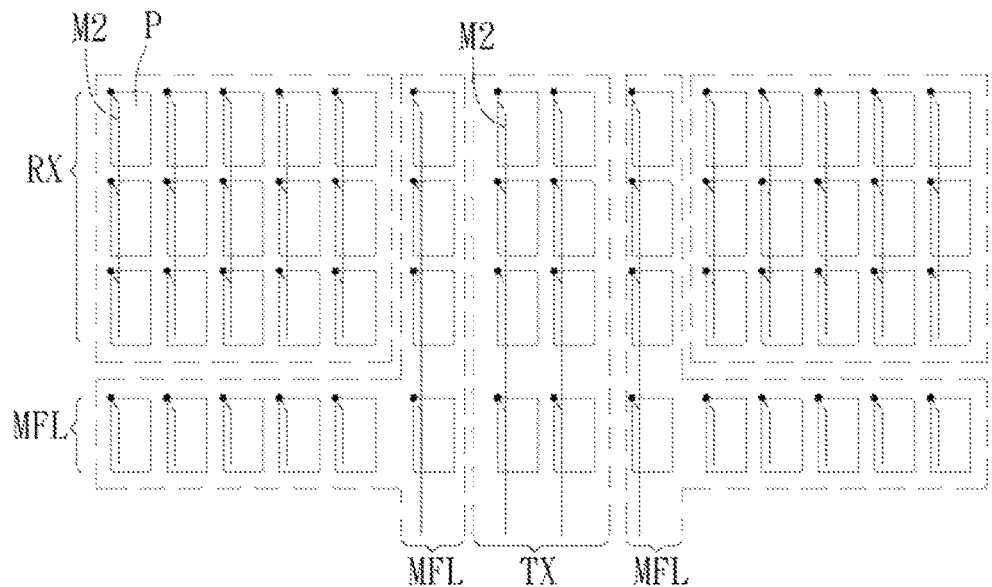
FIG. 15 illustrates a schematic diagram of the electrode traces of FIG. 14 adding the conductive layer M2.

FIG. 15 illustrates a schematic diagram of the electrode traces of FIG. 14 adding the conductive layer M2. As shown in FIG. 15, a plurality of pixels P can be coupled in series by the perpendicular traces of conductive layer M2. The conductive layer M2 can be coupled to the common voltage VCOM. The conductive layer M2 can form open circuit, for example, between the receiver electrodes RX and the multi-function electrodes MFL. The conductive layer M2 can be used as the transmitter electrodes TX to input touch driving signals.

Figure 16:
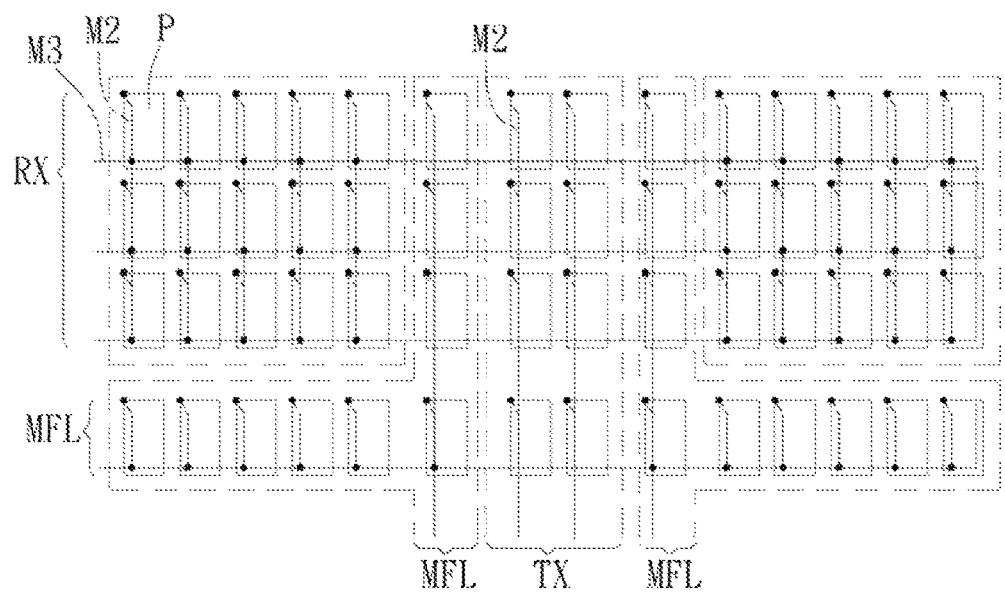
FIG. 16 illustrates a schematic diagram of the electrode traces of FIG. 15 adding the conductive layer M3.

FIG. 16 illustrates a schematic diagram of the electrode traces of FIG. 15 adding the conductive layer M3. As shown in FIG. 16, the pixels P of different receiver electrodes RX can be coupled in series by the lateral traces of conductive layer M3; the pixels P of different multi-function electrodes MFL can be also coupled in series by the lateral traces of conductive layer M3. The conductive layer M3 can be coupled to the conductive layer M2 or not. When the conductive layer M3 is not coupled to the conductive layer M2, the conductive layer M3 can be used as the bridge units of different receiver electrodes RX; the conductive layer M3 can be used as the receiver electrodes RX to receive the touch sensing signals.

It should be noticed that the transparent conductive layers CITO in the dotted line range of the transmitter electrodes TX will be connected to each other; the transparent conductive layers CITO in the dotted line range of the receiver electrodes RX will be connected to each other; the transparent conductive layers CITO in the dotted line range of the multi-function electrodes MFL will be connected to each other.

The electrodes marked TX and RX in FIG. 13, FIG. 14, FIG. 15, and FIG. 16 can be exchanged.

Above all, the in-cell mutual-capacitive touch panel of the invention has following advantages:

(1) The simplest laminated structure design of in-cell touch panel can be formed in this invention by the integration of two conductive layers and original display components. The manufacturing will be easy and the cost can be reduced.

(2) The design of the touch electrodes and their traces in the in-cell touch panel of the invention is very simple.

(3) The effects of resistance and parasitic capacitance of in-cell touch components on the electric properties of the in-cell touch panel can be reduced by the novel trace layout method of the invention.

(4) The RC loading of the middle size touch panel or large size touch panel can be largely reduced by the novel electrode trace method of the invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An in-cell mutual-capacitive touch panel, comprising:
   a plurality of pixels, a laminated structure of each pixel comprising:
   a substrate;
   a thin-film transistor layer disposed above the substrate, a first conductive layer and a second conductive layer being integrated in the thin-film transistor layer, wherein the second conductive layer is connected with a transparent conductive layer coupled to a common voltage;
   a liquid crystal layer, disposed above the thin-film transistor layer;
   a color filtering layer, disposed above the liquid crystal layer; and
   a glass layer, disposed above the color filtering layer;
   wherein the first conductive layer and a part of the second conductive layer are used as bridges of a transmitter electrode and a multi-function electrode out of an upper-side of an active area of the in-cell mutual-capacitive touch panel; another part of the second conductive layer and the transparent conductive layer are used as bridges of the transmitter electrode and the multi-function electrode out of a lower-side of the active area of the in-cell mutual-capacitive touch panel; the in-cell mutual-capacitive touch panel is coupled to at least one driving IC having more than two sets of transmitter electrode pins and multi-function electrode pins; the number of the at least one driving IC is determined according to a size of the in-cell mutual-capacitive touch panel, and the at least one driving IC is disposed out of the active area of the in-cell mutual-capacitive touch panel.

2. The in-cell mutual-capacitive touch panel of claim 1, the second conductive layer comprises a plurality of traces, wherein at least two traces of the second conductive layer are aligned in parallel within the active area of the in-cell mutual-capacitive touch panel.

3. The in-cell mutual-capacitive touch panel of claim 1, wherein the in-cell mutual-capacitive touch panel is applied to displays using in-plane switching liquid crystal (IPS) technology, fringe field switching (FFS) technology, or advanced hyper-viewing angle (AHVA) technology.

4. The in-cell mutual-capacitive touch panel of claim 1, wherein the color filtering layer comprises a color filter and a black matrix resist.

5. The in-cell mutual-capacitive touch panel of claim 4, wherein the first conductive layer and the second conductive layer are disposed under the black matrix resist.

6. The in-cell mutual-capacitive touch panel of claim 1, wherein the first conductive layer and the second conductive layer are coupled.

7. The in-cell mutual-capacitive touch panel of claim 1, wherein the first conductive layer and the second conductive layer are aligned horizontally, perpendicularly, or in a mesh type.

8. The in-cell mutual-capacitive touch panel of claim 1, wherein the second conductive layer disposed above the transparent conductive layer is connected with the transparent conductive layer through a via.

9. The in-cell mutual-capacitive touch panel of claim 1, wherein the second conductive layer disposed under the transparent conductive layer is connected with the transparent conductive layer through a via.

10. The in-cell mutual-capacitive touch panel of claim 1, wherein the transmitter electrode, the multi-function electrode, and a receiver electrode cover different parts of the plurality of pixels, and the multi-function electrode is disposed between the transmitter electrode and the receiver electrode.

11. The in-cell mutual-capacitive touch panel of claim 10, wherein transparent conductive layers in the pixels covered by the transmitter electrode are connected, transparent conductive layers in the pixels covered by the receiver electrode are connected, and transparent conductive layers in the pixels covered by the multi-function electrode are connected.

12. The in-cell mutual-capacitive touch panel of claim 1, wherein the transparent conductive layer is an indium tin oxide (ITO) layer.

13. An in-cell mutual-capacitive touch panel, comprising:
a plurality of pixels, a laminated structure of each pixel comprising:
a substrate;
a thin-film transistor layer disposed above the substrate, a first conductive layer and a second conductive layer being integrated in the thin-film transistor layer, wherein the first conductive layer, a source electrode, and a drain electrode are formed of the same material using the same process on the same layer, and the first conductive layer is connected with a transparent conductive layer coupled to a common voltage, the transparent conductive layer is disposed above the first conductive layer;
a liquid crystal layer, disposed above the thin-film transistor layer;
a color filtering layer, disposed above the liquid crystal layer; and
a glass layer, disposed above the color filtering layer.

14. The in-cell mutual-capacitive touch panel of claim 13, wherein the in-cell mutual-capacitive touch panel is suitable for displays using in-plane switching liquid crystal (IPS) technology, fringe field switching (FFS) technology, or advanced hyper-viewing angle (AHVA) technology.

15. The in-cell mutual-capacitive touch panel of claim 13, wherein the color filtering layer comprises a color filter and a black matrix resist.

16. The in-cell mutual-capacitive touch panel of claim 15, wherein the first conductive layer and the second conductive layer are disposed under the black matrix resist.

17. The in-cell mutual-capacitive touch panel of claim 13, wherein the second conductive layer is connected with the first conductive layer through a via.

18. The in-cell mutual-capacitive touch panel of claim 13, wherein the second conductive layer is not connected with the first conductive layer.

19. The in-cell mutual-capacitive touch panel of claim 13, wherein the transparent conductive layer is an indium tin oxide (ITO) layer.

* * * * *